(12) United States Patent
Sokeila et al.

(10) Patent No.: US 8,994,838 B2
(45) Date of Patent: Mar. 31, 2015

(54) MOTION ADAPTIVE CROPPING FOR VIDEO STABILIZATION

(71) Applicant: Nokia Corporation, Espoo (FI)

(72) Inventors: Tomi Sokeila, Tampere (FI); Juuso Gren, Kyrokoski (FI)

(73) Assignee: Nokia Corporation, Espoo (FI)

( * ) Notice: Subject to any disclaimer, the term of this patent is extended or adjusted under 35 U.S.C. 154(b) by 9 days.

(21) Appl. No.: 13/863,432

(22) Filed: Apr. 16, 2013

(65) Prior Publication Data

US 2014/0307112 A1 Oct. 16, 2014

(51) Int. Cl.
*H04N 5/228* (2006.01)
*H04N 5/262* (2006.01)
*H04N 5/232* (2006.01)

(52) U.S. Cl.
CPC ....... *H04N 5/23267* (2013.01); *H04N 5/23296* (2013.01)
USPC .................................... 348/208.6; 348/240.2

(58) Field of Classification Search
CPC .......... H04N 5/23219; H04N 5/23267; H04N 5/23274; H04N 5/23296
USPC ............... 348/208.6, 208.14, 240.2
See application file for complete search history.

(56) References Cited

U.S. PATENT DOCUMENTS

| | | | | |
|---|---|---|---|---|
| 6,115,067 A | * | 9/2000 | Koyama | 348/240.3 |
| 7,800,652 B2 | * | 9/2010 | Tang et al. | 348/208.6 |
| 7,880,769 B2 | * | 2/2011 | Qi | 348/208.6 |
| 8,264,522 B2 | * | 9/2012 | Martin et al. | 348/14.16 |
| 8,264,555 B2 | * | 9/2012 | Tang et al. | 348/208.6 |
| 8,681,238 B2 | * | 3/2014 | Kinoshita | 348/208.6 |
| 8,743,222 B2 | * | 6/2014 | Hamalainen | 348/208.99 |
| 2004/0070666 A1 | * | 4/2004 | Bober et al. | 348/14.01 |
| 2005/0088531 A1 | * | 4/2005 | Chiba | 348/208.1 |
| 2008/0218596 A1 | * | 9/2008 | Hoshino | 348/222.1 |
| 2009/0251594 A1 | * | 10/2009 | Hua et al. | 348/441 |
| 2010/0329550 A1 | * | 12/2010 | Cheatle | 382/165 |
| 2011/0141219 A1 | * | 6/2011 | Yeh | 348/14.02 |
| 2012/0038796 A1 | * | 2/2012 | Posa et al. | 348/240.2 |
| 2012/0105654 A1 | * | 5/2012 | Kwatra et al. | 348/208.4 |
| 2012/0281106 A1 | * | 11/2012 | Foster et al. | 348/222.1 |
| 2013/0176463 A1 | * | 7/2013 | Hyvarinen | 348/240.99 |
| 2013/0182134 A1 | * | 7/2013 | Grundmann et al. | 348/208.6 |
| 2014/0002742 A1 | * | 1/2014 | Chamaret et al. | 348/571 |
| 2014/0071299 A1 | * | 3/2014 | Grundmann et al. | 348/208.99 |

* cited by examiner

*Primary Examiner* — John Villecco
(74) *Attorney, Agent, or Firm* — Harrington & Smith

(57) ABSTRACT

Determining an amount of motion in a second frame of video with reference to a first frame of video. Adaptively predicting a cropping factor for the second frame in response to the determined amount of motion. The cropping factor specifies a portion of the second frame that is to be excluded from the second frame. The predicted cropping factor is adaptively changed for a successive plurality of frames by buffering the first frame to predict a desired cropping factor for the second frame, wherein the first frame occurs prior to the second frame.

20 Claims, 3 Drawing Sheets

MOTION ADAPTIVE CROPPING FOR VIDEO STABILIZATION

TECHNICAL FIELD

The exemplary and non-limiting embodiments of this invention relate generally to electronic imaging and, more specifically, to motion adaptive cropping for video stabilization in electronic devices such as digital cameras and other devices related to computational photography.

BACKGROUND ART

This section is intended to provide a background or context to the embodiments disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

In digital video stabilization, frames may be cropped to fill the stabilized frames with content. In conventional applications, about 5-10% of the frame may be cropped and removed, with the amount of cropping being constant over time. One disadvantage of cropping is that it may reduce the field of view (FOV) of the stabilized frames. Providing a reduced field of view should be avoided if at all possible. The reduced field of view is especially problematic in wide angle applications. However, if a captured scene exhibits no global movement, there is no need to perform any cropping. Global movement refers to movement of an entire scene which may occur, for example, if the photographer's hand shakes while images are being gathered. Essentially, the smaller the movement is in a captured scene, the less cropping that is needed, and vice versa.

SUMMARY

According to a first set of exemplary embodiments of the invention, a method comprises determining an amount of motion in a second frame of video with reference to a first frame of video, and adaptively predicting a cropping factor for the second frame in response to the determined amount of motion, wherein the cropping factor specifies a portion of the second frame that is to be excluded from the second frame.

According to a second set of exemplary embodiments of the invention, an apparatus comprises at least one processor and a memory storing a set of computer instructions, in which the processor and the memory storing the computer instructions are configured to cause the apparatus to perform determining an amount of motion in a second frame of video with reference to a first frame of video, and adaptively predicting a cropping factor for the second frame in response to the determined amount of motion, wherein the cropping factor specifies a portion of the second frame that is to be excluded from the second frame.

According to a third set of exemplary embodiments of the invention, a non-transitory computer readable memory is encoded with a computer program comprising computer readable instructions recorded thereon for execution of a method comprising determining an amount of motion in a second frame of video with reference to a first frame of video, and adaptively predicting a cropping factor for the second frame in response to the determined amount of motion, wherein the cropping factor specifies a portion of the second frame that is to be excluded from the second frame.

According to a set of further embodiments of the invention, the predicted cropping factor is adaptively changed for a successive plurality of frames by buffering the first frame to predict a desired cropping factor for the second frame, wherein the first frame occurs prior to the second frame.

BRIEF DESCRIPTION OF THE DRAWINGS

For a better understanding of the nature and objects of the embodiments described herein, reference is made to the following detailed description taken in conjunction with the following drawings, in which.

DETAILED DESCRIPTION

Figure 1:
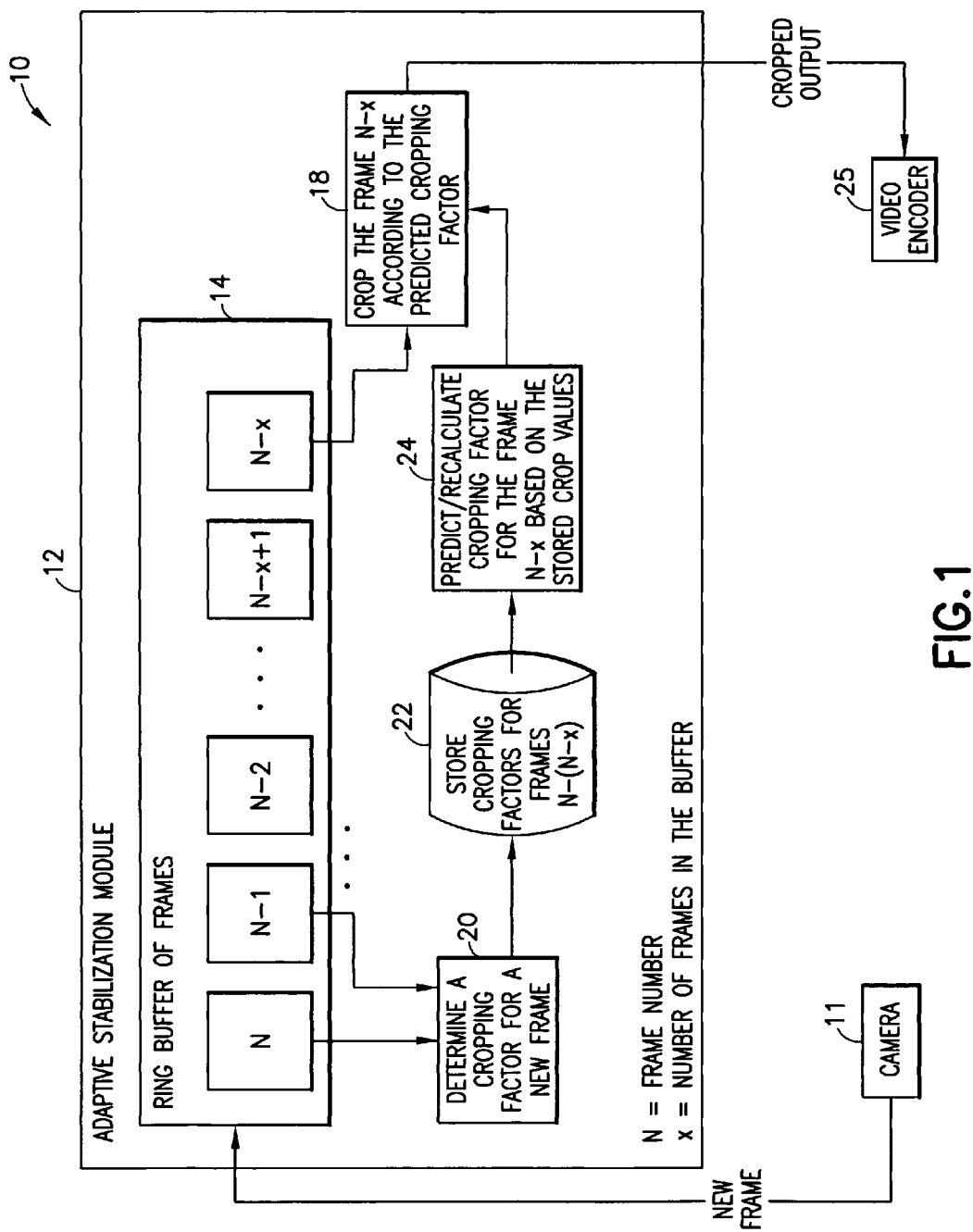
FIG. 1 is a block diagram showing an illustrative apparatus for performing motion adaptive video stabilization using frame cropping according to a set of exemplary embodiments of the invention described herein.

Conventional video stabilization uses a constant cropping factor wherein the cropping factor specifies a portion of the frame that is to be excluded from the frame. In other words, the cropping factor remains the same for each of a plurality of successive frames. Moreover, conventional video stabilization is performed on a frame-by-frame basis without taking into consideration video data in preceding or successive frames. Although there are video stabilization solutions which may provide a buffer for frames in order to "predict" a future movement direction and amplitude, these implementations use a fixed cropping factor without any adaptation or prediction of desired cropping.

New methods, apparatuses, and software related products (such as a non-transitory computer readable memories) are presented herein for video stabilization using motion adaptive cropping. These methods, apparatuses, and software related products may, but need not, be implemented in the form of electronic devices such as digital cameras, camera-phones, smartphones, and similar devices related to computational photography. According to various embodiments described herein, the cropping factor may be changed adaptively from frame to frame based at least on a future prediction of motion in a frame in order to optimize a field of view (FOV) based on a determined or measured amount of motion of at least one object in a scene comprising a frame. An optimal cropping factor or a minimized cropping factor may be used based on the future prediction to make the cropping factor change smoothly over time. From the perspective of a user, changing the amount of cropping in a frame may be conceptualized as being similar to zooming in or out. Changing the amount of cropping on a frame-by-frame basis over time can be performed smoothly and intelligently, as will be described herein.

According to an illustrative set of embodiments, an apparatus such as a digital camera, camera-phone, or smartphone receives a plurality of image frames (for example, consecutive image frames) of a scene. The apparatus determines a cropping factor for each of the plurality of image frames, wherein the determined cropping factor is based upon detecting an amount of motion for each of the plurality of video frames to provide a desired or specified amount of image stabilization. A prediction or recalculation of the cropping factor is performed for a first image frame of the plurality of received image frames. The prediction or recalculation may be performed using a predetermined criterion based on one or more previously determined cropping factors for one or more previously received image frames of the plurality of image frames that were received prior to the first image frame. The prediction or recalculation is used to determine a cropping factor for at least a second image frame that is received subsequent to the first image frame.

Future prediction for the cropping factor may be implemented, for example, by providing a ring buffer to store a plurality of frames which together comprise a prediction period. Motion analysis may be performed for a newest frames in the ring buffer. The cropping is performed on an oldest frame or an oldest set of frames in the ring buffer. This approach provides a smooth implementation of the required cropping factor for the plurality of received frames. When the motion of one or more objects in the scene is increased or decreased (as known based on more recent frames), the cropping factor may be smoothly adapted to meet that increase or decrease.

On the other hand, if a new motion starts very suddenly so that subsequent frames may be totally blurred, the cropping factor change could be implemented more rapidly or even instantaneously, such that the user would not be able to detect any zooming effect.

It is also possible to utilize information (such as frame analysis or hardware sensor analysis) not related to the motion in order to optimize the cropping factor. For example, if there is a face (or another object of interest) detected in the received image frames, it may be desired to avoid cropping the object altogether. Cropping may also be performed non-centrically or non-symmetrically with respect to one or more image boundaries (such as cropping in a predominant direction) to avoid cropping an important subject. For example, if a face is detected and the image frame only requires horizontal stabilization, a vertical crop only of the image frame could be implemented.

The approach described herein may be also used to optimize image or video quality, such as enhancing sharpness by using an up-scaling process. In other applications, the cropping may decrease the resolution of a frame to make the frame take up less memory storage space than a specified or desired maximum. If the input resolution is expected to be the same as (or even lower than) the expected output, up-scaling may be performed constantly. However, the more up-scaling that is required, the more image quality that is lost. With an adaptive cropping factor, the quality or sharpness may be sacrificed in situations where there is increased movement of objects in the scene, because the visual sharpness may be less important in these scenarios. With more sophisticated tuning of the adaptive cropping factor, the optimal up-scaling factors (e.g. specific for ISP or scaling algorithm to be used) may be prioritized and mapped to use cropping factors.

Determining a minimum cropping factor in order to obtain a maximum FOV while, at the same time, maintaining image quality is important for some applications. For example, in editor use cases, there is no extra resolution available for stabilization. Also, the input resolution can be larger than the target output resolutions. In this case, the cropped image can be adjusted to the correct size by either downscaling or up-scaling. Furthermore, the cropping factor determination and video stabilization may be performed either during the capture or after the capture as an editor feature.

FIG. 1 is a block diagram showing an illustrative apparatus 10 for performing motion adaptive video stabilization using frame cropping according to a set of exemplary embodiments of the invention described herein. The apparatus 10 comprises at least a ring buffer of frames 14, a camera 11, and a video encoder 25. The ring buffer of frames 14 may be part of an adaptive stabilization module 12. An exemplary process flow for the apparatus 10 may be described as follows.

A plurality of image frames designated as N, N-1, N-2 ... N-x+1, and N-x are captured by the camera 11 and received by the adaptive stabilization module 12. At step 20, each of the image frames (N, N-1, N-2 ... N-x+1, and N-x) is analyzed by a processing module included in the adaptive stabilization module 12 to determine a cropping factor for each of the plurality of image frames N, N-1, N-2 ... N-x+1, and N-x so as to provide image stabilization for each of the plurality of image frames. Next, at step 22, each of the plurality of image frames N, N-1, N-2 ... N-x+1, and N-x is then stored in the ring buffer 14 with the determined cropping factor. The ring buffer 14 is configured to hold a certain number of frames and may be continuously or periodically or repeatedly updated with new frames. For example, the number of frames stored by the ring buffer 14 may, but need not, be 10 frames or 16 frames.

At step 24, the determined cropping factors stored in the ring buffer 14 are analyzed by the processing module in the adaptive stabilization module 12 to predict, calculate, or estimate an applied cropping factor to be applied to a most recent or last frame N stored in the ring buffer 14. The predicted, calculated, or estimated cropping factor for an oldest or first frame N-x may, but need not, be the same as an individual cropping factor that was determined for the first frame N-x at step 20. Thus, a knowledge of the cropping factor for one or more subsequently occurring frames N makes it possible to apply the predicted cropping factor to one or more previously occurring frames N-x to provide for a gradual transition from a first cropping factor to a second cropping factor, wherein the first cropping factor is not the same as the second cropping factor. Therefore, a smooth transition is provided between relatively high cropping factors and relatively small cropping factors and vice versa, by using one or more subsequently occurring frames stored in the buffer 14 to determine an appropriate cropping factor for one or more previously occurring frames. Thus, the predicted cropping factor may be conceptualized as an optimized cropping factor.

At step 18, the oldest or first frame N-x is image stabilized by cropping using the optimized or predicted cropping factor determined at step 24. The cropped first frame N-x is passed forward to the video encoder 25. The oldest or first frame N-x is removed from the ring buffer 14 and a new frame can be fetched from the camera 11.

According to a further set of embodiments, predicting, calculating, or estimating the cropping factor at step 24 may be performed not only for the "oldest" first image frame N-x (such as the first received image frame during a prediction period that includes frames N, N-1, N-2 ... N-x+1, N-x), but also for other frames received during the prediction period. In this case the cropping factor (as determined at step 20 and/or step 24 for the frame N-x) can be used for predicting the frames received earlier than frame N-x (and not only for "later" frames received after N-x), such that the cropping factor (determined and/or predicted) for N-x can be taken into consideration for predicting the cropping factor for these earlier frames.

Table 1, presented hereinafter, is an exemplary Cropping Factor Table that may be used to implement steps 20, 22 and 24 of FIG. 1. More specifically, Table 1 illustrates determining the cropping factor and performing smooth cropping (as described in the context of steps 20 and 24 of FIG. 1). As seen in Table 1, the predicted cropping factor that is actually used to perform cropping of an individual frame may be the same as the cropping factor that was determined for this individual frame, as is shown with reference to frames 1, N-5, N-7). Alternatively or additionally, this predicted cropping factor may be different than the cropping factor that was determined for this individual frame, such as may be observed with reference to frames N-1, N-2, N-3, N-4, N-6, N-8, N-9 and N-10.

TABLE 1

Cropping Factor Table

| | Frame Number | | | | | | | | | | |
|---|---|---|---|---|---|---|---|---|---|---|---|
| | N | N-1 | N-2 | N-3 | N-4 | N-5 | N-6 | N-7 | N-8 | N-9 | N-10 |
| Determined cropping for individual frames (as step 20 in FIG. 1) | 1% | 1% | 1% | 3% | 1% | 6% | 6% | 8% | 2% | 1% | 1% |
| Predicted smooth cropping (step 24 in FIG. 1) | 1% | 2% | 3% | 4% | 5% | 6% | 7% | 8% | 6% | 4% | 2% |

Thus advantages and novel features of the embodiments described herein include (but are not limited to) the following features:

providing a stable video image with a maximized field-of-view and a maximized level of quality;

providing adaptive cropping based on an amount of detected motion of the object(s) in the scene;

providing a smooth change for the cropping factor over time (to avoid bad user experience); and utilizing "history" buffers to optimize/predict the smooth change of the cropping factor from frame to frame.

Figure 2:
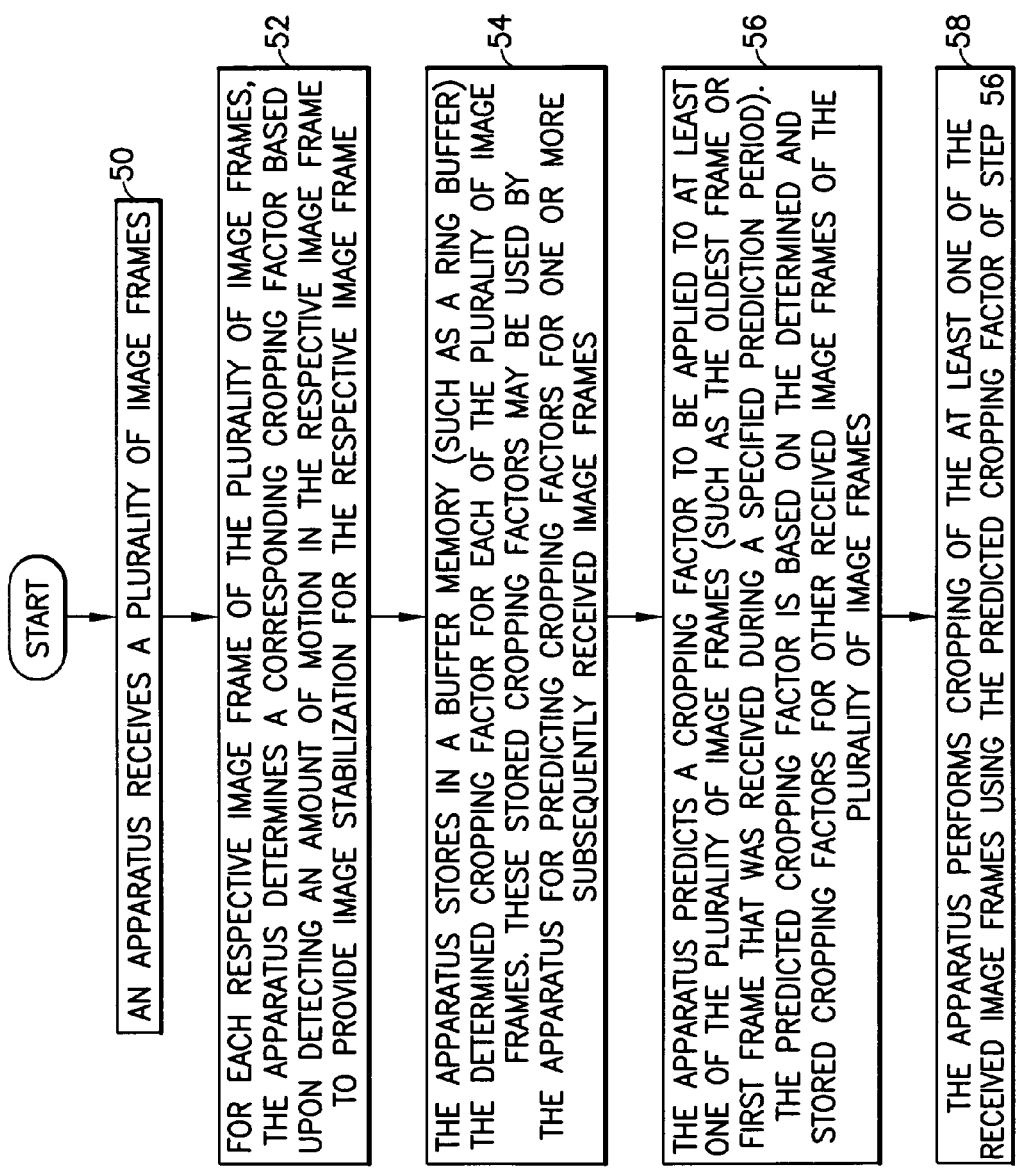
FIG. 2 is a flowchart that illustrates a method, and a result of execution by one or more processors of a set of computer program instructions embodied on a computer readable memory, for performing motion adaptive video stabilization in accordance with a set of exemplary embodiments of the invention described herein.

FIG. 2 is a flowchart that illustrates a method, and a result of execution by one or more processors of a set of computer program instructions embodied on a computer readable memory, for performing motion adaptive video stabilization in accordance with a set of exemplary embodiments of the invention described herein. The method of FIG. 2 may be performed by an electronic device such as, for example, a camera, camera-phone, electronic displaying device, computer, image processing device, or smartphone. The order of steps shown in FIG. 2 is not absolutely required, so in principle, the various steps may be performed in or out of the illustrated order. Also, certain steps may be skipped or selected steps or groups of steps may be performed to meet the requirements of certain specific applications.

The operational sequence of FIG. 2 commences at step 50 where an apparatus receives a plurality of image frames. Illustratively, these image frames are received through an external wireless or wired communications or using an internal camera to capture the image frames. Next, at step 52, for each respective image frame of the plurality of image frames, the apparatus determines a corresponding cropping factor based upon detecting an amount of motion in the respective image frame relative to at least one other frame of the plurality of image frames, to provide image stabilization for the respective image frame.

At step 54, the apparatus stores in a buffer memory (such as a ring buffer) the determined cropping factor for each of the plurality of image frames. These stored cropping factors may be used by the apparatus for predicting cropping factors for one or more subsequently received image frames, as explained herein.

At step 56, the apparatus predicts a cropping factor to be applied to at least one of the plurality of image frames (such as the oldest frame or first frame that was received during a specified prediction period). The predicted cropping factor is based on the determined and stored cropping factors for other received image frames of the plurality of image frames. Next, at step 58, the apparatus performs cropping of the at least one of the received image frames using the predicted cropping factor of step 56.

Figure 3:
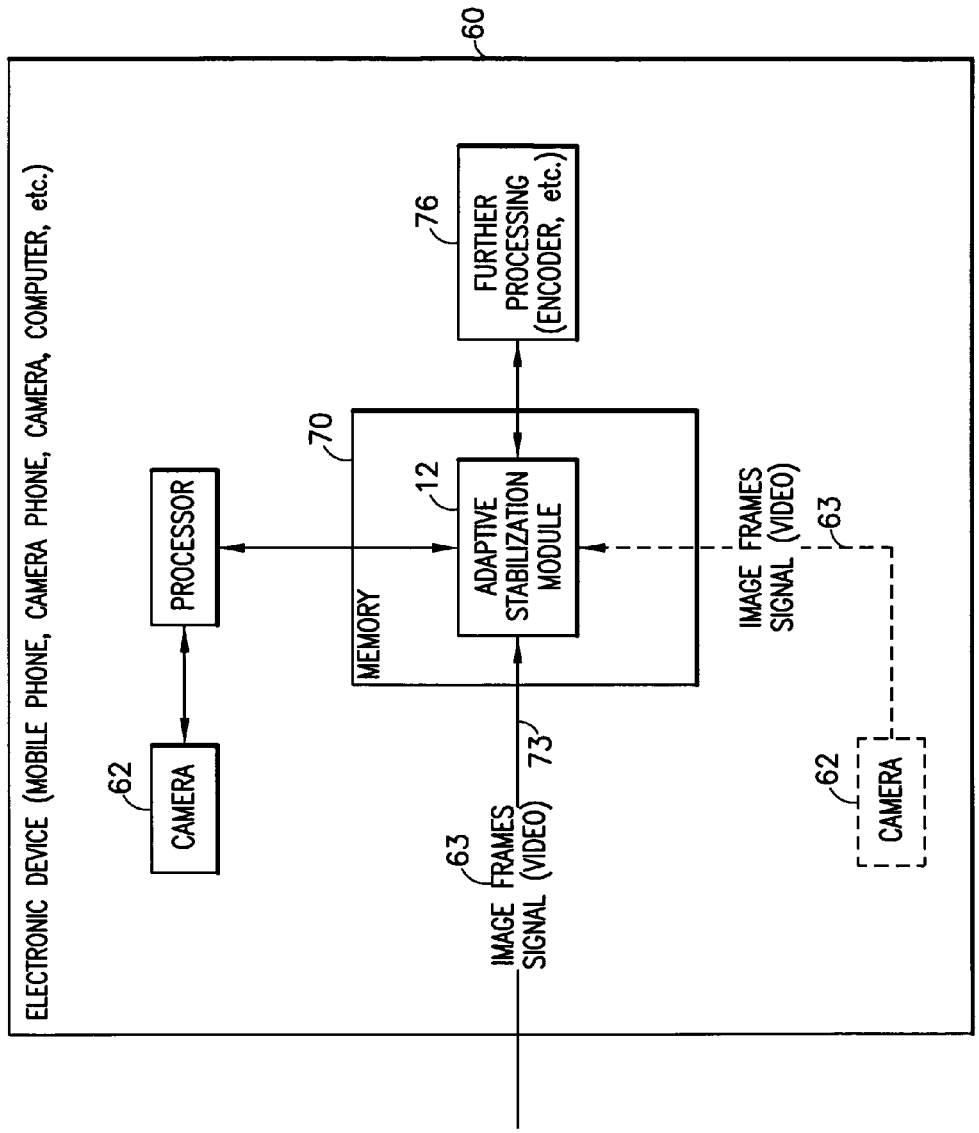
FIG. 3 is a block diagram of an illustrative electronic device for practicing a set of exemplary embodiments of the invention described herein.

FIG. 3 is a block diagram of an illustrative electronic device 60 for practicing a set of exemplary embodiments of the invention described herein. The electronic device 60 may be implemented as a portable or non-portable electronic device, a computer, a wireless communication device, a camera, a camera phone or the like. The device 60 includes an adaptive stabilization application module 12. The adaptive stabilization application module 12 may include, for example, the ring buffer 14 of FIG. 1 for implementing steps 50-58 of FIG. 2 as described herein. The adaptive stabilization module 12 (FIG. 3) may receive an image frames signal 63 via an external link 73, as performed at step 50 of FIG. 2. The external link 73 may represent, for example, a wireless communication link or a wired connection or any of various combinations thereof. Alternatively or additionally, the image frames signal 63 may be generated by a camera 62 included in the apparatus 60 or an external camera.

The device 60 further comprises at least one memory 70 that stores program code for implementing the adaptive stabilization module 12. The device 60 also comprises at least one processor 76 operatively coupled to the memory 70. Various embodiments of the memory 70 (such as a non-transitory computer readable memory for example) may include any data storage technology type which is suitable to the local technical environment, including but not limited to semiconductor-based memory devices, magnetic memory devices and systems, optical memory devices and systems, fixed memory, removable memory, disc memory, flash memory. DRAM, SRAM, EEPROM and the like, implemented as non-transitory computer readable memories. Various embodiments of the processor 76 include, but are not limited to, general purpose computers, special purpose computers, microprocessors, digital signal processors (DSPs) and multi-core processors.

The adaptive stabilization module 72 may be implemented as an application computer program stored in the memory 70, but in general it may be implemented as software, firmware and/or hardware module or a combination thereof. In particular, in the case of software or firmware, one embodiment may be implemented using a software related product such as a computer readable memory (such as non-transitory computer readable memory), computer readable medium or a computer readable storage structure comprising computer readable instructions (such as program instructions) using a computer program code (i.e., the software or firmware) thereon to be executed by a computer processor. Furthermore, the adaptive stabilization module 72 may be implemented as a separate block or may be combined with any other module/block of the electronic device 60, or it may be split into several blocks according to the functionality of the several blocks.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method comprising:
an apparatus determining an amount of motion in a second frame of video with reference to a first frame of video;
the apparatus adaptively predicting a cropping factor for the second frame in response to the determined amount of motion, wherein the cropping factor specifies a portion of the second frame that is to be excluded from the second frame;
the apparatus transforming the second frame by applying the cropping factor to the second frame to generate a cropped second frame; and
the apparatus storing in a buffer memory of the apparatus corresponding cropping factors for respective first and second image frames, wherein the apparatus uses at least one of the stored corresponding cropping factors to predict at least one applied cropping factor to be applied to one or more of the respective frames.

2. The method of claim 1 wherein the apparatus adaptively changes the predicted cropping factor for a successive plurality of frames by buffering the first frame to predict a desired cropping factor for the second frame, wherein the first frame occurs prior to the second frame.

3. The method of claim 1 further comprising the apparatus detecting a face or other object of interest in at least one of the received image frames, and adjusting the cropping factor so as not to exclude any portion of the face or other object of interest.

4. The method of claim 3 wherein the cropping factor specifies the apparatus performing cropping non-centrically or non-symmetrically with respect to one or more image frame boundaries.

5. A method comprising:
receiving at an apparatus a plurality of image frames of a scene;
for each of respective image frames of the plurality of image frames, determining at the apparatus a corresponding cropping factor based upon detecting an amount of motion in the respective image frame relative to at least one other image frame of the plurality of image frames to provide image stabilization for the respective frame;
the apparatus transforming the respective image frame by applying the cropping factor to the respective image frame to generate a respective cropped image frame; and
storing in a buffer memory of the apparatus the corresponding cropping factors for the respective image frames, wherein the apparatus uses at least one of the stored corresponding cropping factors to predict at least one applied cropping factor to be applied to one or more of the respective image frames:.

6. The method of claim 5, wherein the at least one applied cropping factor that is applied to an image frame of the one or more respective image frames is different from the corresponding cropping factor for the image frame that is stored in the buffer memory.

7. The method of claim 5, wherein the apparatus performs predicting of the at least one applied cropping factor to provide a smooth change of the cropping factor from a first image frame to a second image frame in the plurality of image frames.

8. The method of claim 5, wherein the plurality of image frames are temporally consecutive frames.

9. The method of claim 5, wherein one of the received image frames is a first received image frame out of the plurality of the image frames.

10. The method of claim 5, wherein the predicting of the at least one applied cropping factor is based on increasing or decreasing of a motion of one or more objects in the scene within the plurality of image frames to provide a smooth adaptation of the applied cropping factor within the plurality of image frames.

11. The method of claim 10, wherein the predicting of the at least one applied cropping factor is based upon a sudden increase or decrease of a motion of one or more objects in the scene within the plurality of image frames, to provide a smooth adaptation of the at least one applied cropping factor such that a that a user does not detect a zooming effect.

12. The method of claim 5, wherein the predicting of the at least one applied cropping factor is further based on a content of the plurality of image frames.

13. The method of claim 5, wherein the predicting of the at least one applied cropping factor for the at least one of the received image frames is based on analysis of image frames received only before the at least one of the received image frames.

14. The method of claim 5, wherein the predicting of the at least one applied cropping factor for the at least one of the received image frames is based on analysis of image frames received before and after the at least one of the received image frames.

15. The method of claim 5, wherein receiving the plurality of image frames comprises receiving by the apparatus the plurality of image frames externally through a wireless or wired link.

16. The method of claim 5, wherein receiving the plurality of image frames comprises acquiring by the apparatus the plurality of image frames.

17. An apparatus comprising at least one processor and a memory storing a set of computer instructions, in which the processor and the memory storing the computer instructions are configured to cause the apparatus to perform:
determining an amount of motion in a second frame of video with reference to a first frame of video;
adaptively predicting a cropping factor for the second frame in response to the determined amount of motion, wherein the cropping factor specifies a portion of the second frame that is to be excluded from the second frame; and storing in a buffer memory of the apparatus corresponding cropping factors for respective first and second image frames, wherein the apparatus uses at least one of the stored corresponding cropping factors to predict at least one applied cropping factor to be applied to one or more of the respective frames.

18. The apparatus of claim 17 wherein the predicted cropping factor is adaptively changed for a successive plurality of frames by buffering the first frame to predict a desired cropping factor for the second frame, wherein the first frame occurs prior to the second frame.

19. An apparatus comprising at least one processor and a memory storing a set of computer instructions, in which the processor and the memory storing the computer instructions are configured to cause the apparatus to perform:

receiving at an apparatus a plurality of image frames of a scene;

for each of respective image frames of the plurality of image frames, determining at the apparatus a corresponding cropping factor based upon detecting an amount of motion in the respective image frame relative to at least one other image frame of the plurality of image frames to provide image stabilization for the respective frame; and storing in a buffer memory the corresponding cropping factors for the respective image frames, and using at least one of the stored corresponding cropping factors to predict at least one applied cropping factor to be applied to one or more of the respective image frames.

20. A non-transitory computer readable memory encoded with a computer program comprising computer readable instructions recorded thereon for execution of a method comprising:

determining an amount of motion in a second frame of video with reference to a first frame of video, and adaptively predicting a cropping factor for the second frame in response to the determined amount of motion, wherein the cropping factor specifies a portion of the second frame that is to be excluded from the second frame; and storing in a buffer memory of the apparatus corresponding cropping factors for respective first and second image frames, wherein the apparatus uses at least one of the stored corresponding cropping factors to predict at least one applied cropping factor to be applied to one or more of the respective frames.

\* \* \* \* \*